United States Patent
Sharma et al.

(10) Patent No.: US 9,290,910 B2
(45) Date of Patent: Mar. 22, 2016

(54) AUTOMATIC ARTICULATION FAILURE MODE PROTECTION

(71) Applicant: Caterpillar Inc., Peoria, IL (US)

(72) Inventors: Amit Sharma, Peoria, IL (US); Steven C. Budde, Dunlap, IL (US); Brad Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/216,543

(22) Filed: Mar. 17, 2014

(65) Prior Publication Data

US 2015/0259880 A1 Sep. 17, 2015

(51) Int. Cl.
| B62D 6/00 | (2006.01) |
| G01L 3/00 | (2006.01) |
| D05B 21/00 | (2006.01) |
| E02F 9/20 | (2006.01) |
| E02F 9/08 | (2006.01) |

(52) U.S. Cl.
CPC .............. *E02F 9/2025* (2013.01); *B62D 6/003* (2013.01); *E02F 9/0841* (2013.01); *E02F 9/2087* (2013.01)

(58) Field of Classification Search
USPC ....................................... 701/41; 112/470.06
See application file for complete search history.

(56) References Cited

U.S. PATENT DOCUMENTS

| 4,399,884 A | 8/1983 | Vandehey |
| 5,356,260 A | 10/1994 | Ikari et al. |
| 5,379,220 A | 1/1995 | Allen et al. |
| 5,768,810 A | 6/1998 | Ahn |
| H1846 H | 4/2000 | Poorman |
| 6,152,237 A | 11/2000 | Hartman et al. |
| 6,152,239 A | 11/2000 | Kelley et al. |
| 6,212,483 B1 * | 4/2001 | Carew .................. G05B 19/042 701/29.4 |
| 6,266,596 B1 | 7/2001 | Hartman et al. |
| 6,299,181 B1 | 10/2001 | Ericksson |
| 7,325,636 B2 | 2/2008 | Yeoman et al. |
| 7,588,088 B2 | 9/2009 | Zachman |
| 7,766,104 B2 | 8/2010 | Newberry et al. |
| 8,060,299 B2 | 11/2011 | Gharsalli et al. |
| 8,548,680 B2 | 10/2013 | Ryerson et al. |
| 2005/0288834 A1 | 12/2005 | Heiniger et al. |
| 2006/0025894 A1 * | 2/2006 | O'Connor .............. G01C 21/20 701/1 |
| 2006/0042838 A1 | 3/2006 | Yeoman et al. |
| 2006/0243180 A1 * | 11/2006 | Sundermeyer ......... A01B 63/00 112/470.06 |
| 2007/0250236 A1 | 10/2007 | Newberry et al. |
| 2008/0263912 A1 * | 10/2008 | Gharsalli ................ E02F 3/844 37/382 |
| 2010/0010703 A1 * | 1/2010 | Coats ..................... G05D 1/024 701/29.6 |

(Continued)

FOREIGN PATENT DOCUMENTS

| EP | 0233945 | 9/1987 |
| WO | 2013/148428 A1 | 10/2013 |

*Primary Examiner* — Thomas G Black
*Assistant Examiner* — Tyler Paige
(74) *Attorney, Agent, or Firm* — Miller, Matthias & Hull LLP; Edward Lin

(57) ABSTRACT

Activation of an automatic articulation control function in an articulated machine is delayed until error conditions are cleared or a steering angle to alignment angle mismatch is corrected. A controller monitors a selector setting indicating a desire to activate the automatic articulation control function. The controller also evaluates whether conditions such as low ground speed, loss of signal from needed sensors, or articulation misalignment are present. If so, the conditions are monitored and when corrected, the automatic articulation control function is activated. An indicator may be set to inform an operator that the automatic articulation control function is pending activation.

16 Claims, 9 Drawing Sheets

(56) References Cited

U.S. PATENT DOCUMENTS

| | | | |
|---|---|---|---|
| 2010/0322753 A1 | 12/2010 | Brooks et al. | |
| 2011/0029199 A1* | 2/2011 | Saito | E02F 9/225 701/41 |
| 2011/0035109 A1* | 2/2011 | Ryerson | B62D 9/00 701/42 |
| 2013/0255977 A1* | 10/2013 | Braunstein | E02F 3/764 172/4.5 |
| 2013/0304331 A1* | 11/2013 | Braunstein | E02F 3/844 701/50 |
| 2014/0324291 A1* | 10/2014 | Jones | E02F 9/20 701/41 |

* cited by examiner

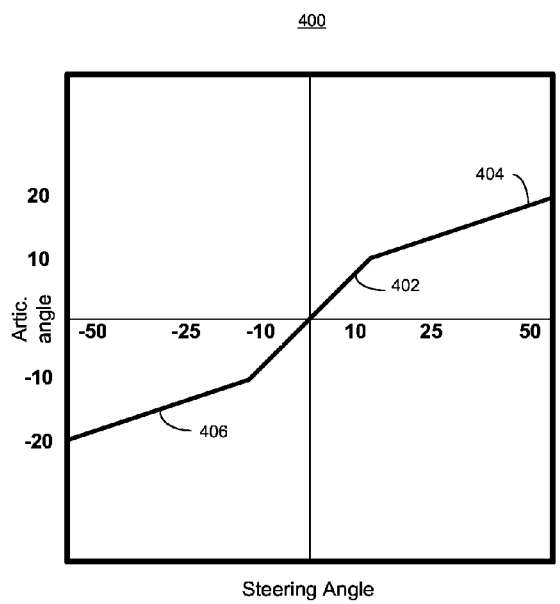
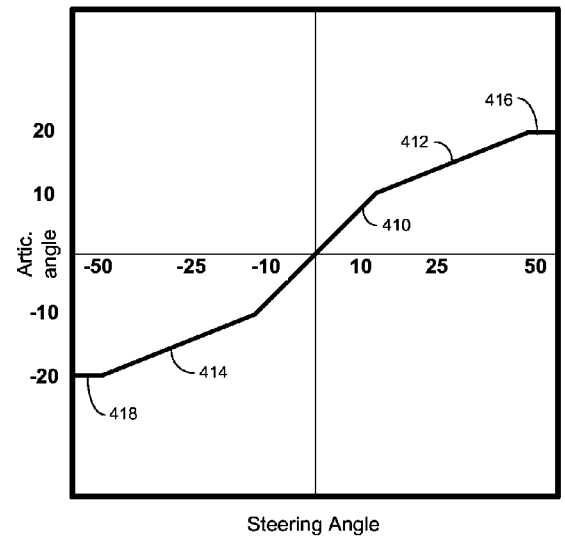
Fig. 7
Fig. 8

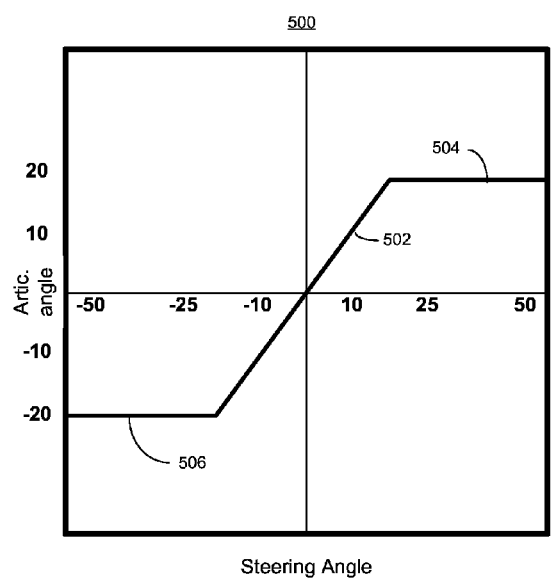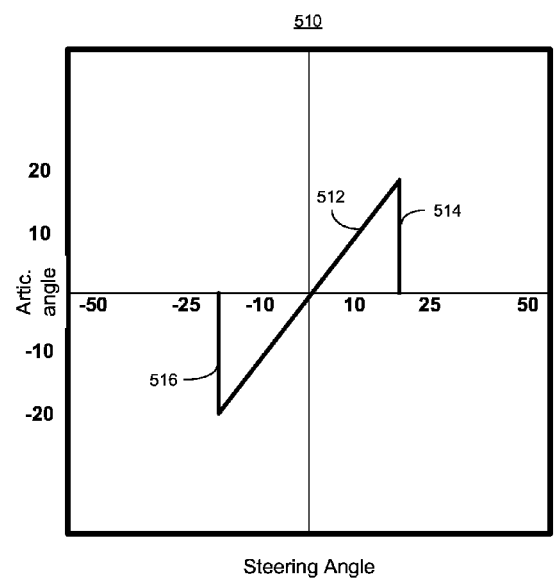
Fig. 11
Prior art
Fig. 12
Prior art

AUTOMATIC ARTICULATION FAILURE MODE PROTECTION

TECHNICAL FIELD OF THE DISCLOSURE

The present disclosure generally relates to articulated machines such as motor graders and, more particularly, relates to a system and method for automatically controlling articulation of an articulated machine.

BACKGROUND OF THE DISCLOSURE

An articulated machine, such as a motor grader, is a versatile apparatus for road work, ditch work, site preparation and other surface contouring and finishing tasks. The versatility of a motor grader is provided in large part by its multiple course setting and course change options. In particular, a motor grader typically includes a steering function implemented via steerable ground engaging wheels while also allowing some degree of course correction or steering via lateral arching or articulation of the machine frame. In this manner, for example, a motor grader may be steered and articulated to follow a curve without driving the rear wheels across the area inside the curve and disturbing the just graded area.

As should be recognized from the above, motor graders, and other articulated machines, are complex pieces of heavy machinery and are operatively complex. Controlling a motor grader includes numerous hand-operated controls to steer the front wheels, position the blade, control articulation, control auxiliary devices such as rippers and plows, and various displays for monitoring machine conditions and/or functions. Control of a motor grader requires highly skilled and focused operators to position the blade while controlling steering.

Automatic articulation control can help relieve an operator of an articulated machine from the moment-to-moment monitoring of articulation while making turns but for reasons including safety, such system may be disengaged under different conditions, such as when the speed of a vehicle exceeds a threshold speed. For example, U.S. Patent Application Publication 2011/0035109 ("Steering System with Automated Articulation Control") describes a system wherein machine articulation is automatically controlled based on machine steering. The system of the '109 publication adjusts machine articulation to follow steering angles and commands, thereby maintaining tracking between the front and rear wheels of the machine. Automated articulation be automatically disengaged when the ground speed of the machine exceeds a limit.

However, there may be situations in which the automatic disengagement of the automated articulation control function may leave the machine in an undesirable articulated position, such as when increasing speed past the limit or other condition while executing a turn. Sudden reactivation of the automatic articulation control function when the actual and desired steering angle are not aligned may cause a rapid and perhaps unexpected change in articulation angle.

SUMMARY OF THE DISCLOSURE

In accordance with one aspect of the present disclosure, a method of managing articulation in an articulated machine includes identifying, at an electronic controller, operating conditions that are incompatible with automatic articulation control, receiving a signal requesting activation of an automatic articulation control function, and pending activation of the automatic articulation control function when an operating condition exists that is incompatible with operation of the automatic articulation control function. The method may also include determining that the operating condition has cleared, and when the operating condition is clear, activating the automatic articulation control function. The method may also include changing an articulation angle of the articulated machine responsive to changes in a steering angle of the articulated machine after activating the automatic articulation control function.

In accordance with another aspect of the present disclosure, a controller that manages articulation in an articulated machine may include a processor, at least one sensor input that receives information used to determine an actual articulation angle and at least one sensor input that receives information used to determine a steering angle for use in determining a desired articulation angle. The controller may also include a memory storing computer-executable instructions that when executed by the processor cause the controller to receive a signal requesting activation of an automatic articulation control function and to evaluate whether the actual articulation angle and the desired articulation angle are within a preset range. The controller may also be programmed to activate the automatic articulation control function only when the actual articulation angle and the desired articulation angle are within the preset range and to provide a signal that causes a change in the actual articulation angle of the articulated machine responsive to changes in the steering angle after activating the automatic articulation control function.

In accordance with yet another aspect of the present disclosure, a an articulated machine having front wheels that are steerable with the front wheels attached to a front frame and the front frame and a rear frame pivotally connected at an articulation joint may use a method of managing an automatic articulation control function using an electronic controller. The method may include determining that the automatic articulation control function is pending activation, determining that a condition exists that contravenes the automatic articulation control function from being activated, and continue pending activation of the automatic articulation control function until determining that all conditions that contravene activation of the automatic articulation control function have been cleared. The method may also include activating, at the electronic controller, the automatic articulation control function and operating the articulated machine using the automatic articulation control function.

Other features and advantages of the disclosed systems and principles will become apparent from reading the following detailed disclosure in conjunction with the included drawing figures.

BRIEF DESCRIPTION OF THE DRAWINGS

FIGS. 7-10 are exemplary transfer functions related to full range and non-linear articulation to steering angle control; and FIGS. 11-12 are prior art transfer functions related to partial range steering control angle.

DETAILED DESCRIPTION OF THE DISCLOSURE

The present disclosure provides a system and method that uses an automatic articulation system for enabling an operator of a motor grader or other articulated machine to optimize use of the articulation capabilities of the articulated machine. In particular, the system and method may employ a controller that prevents automatic articulation control functions from starting or disables automatic articulation control when any of a number of conditions are detected. In addition, some automatic articulation control features may allow limited operation to correct an undesired articulation angle prior to disabling or suspending operation. As disclosed below, the automatic articulation control functions improve both safety and ease of use as well as providing additional articulation tracking modes.

Figure 1:
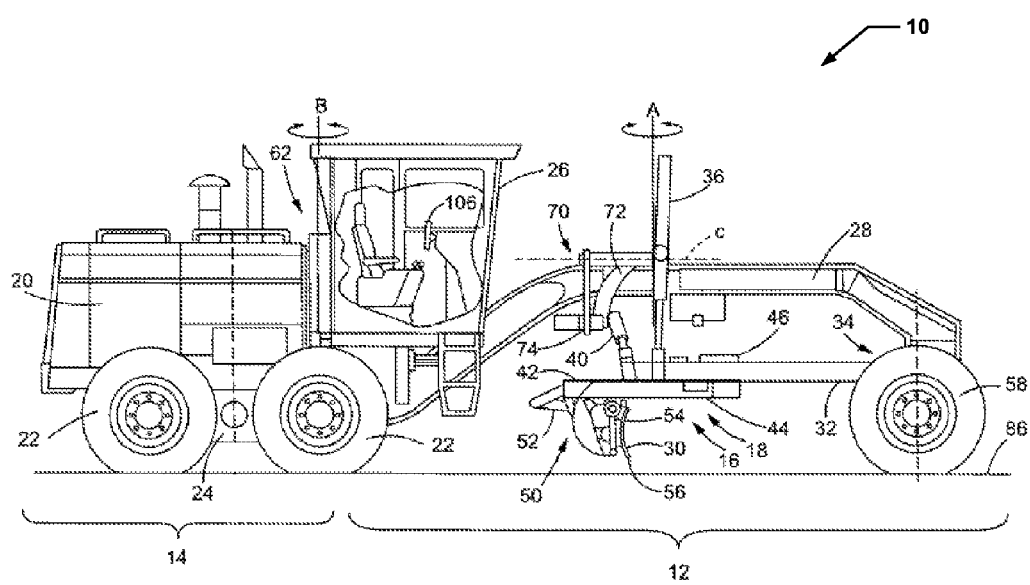
FIG. 1 is a side view of a motor grader constructed in accordance with the present disclosure.

FIG. 1 is a schematic side view of an articulated machine 10, specifically, a motor grader in accordance with an embodiment of the present disclosure. The articulated machine 10 includes a front frame 12, rear frame 14, and a work implement 16, e.g., a blade assembly 18, also referred to as a drawbar-circle-moldboard assembly (DCM). The rear frame 14 includes a power source (not shown), contained within a rear compartment 20, that is operatively coupled through a transmission (not shown) to rear traction devices or wheels 22 for primary machine propulsion.

As shown, the rear wheels 22 are operatively supported on tandem axels 24 which are pivotally connected to the machine between the rear wheels 22 on each side of the articulated machine 10. The power source may be, for example, a diesel engine, a gasoline engine, a natural gas engine, or any other engine known in the art. The power source may also be an electric motor linked to a fuel cell, capacitive storage device, battery, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

The front frame 12 typically supports an operator station 26 that contains operator controls 106, along with a variety of displays or indicators used to convey information to the operator, for primary operation of the articulated machine 10. The front frame 12 may also include a beam 28 that supports the blade assembly 18 and which is employed to move the blade 30 to a wide range of positions relative to the articulated machine 10. The blade assembly 18 includes a drawbar 32 pivotally mounted to a first end 34 of the beam 28 via a ball joint (not shown) or the like. The position of the drawbar 32 is typically controlled by hydraulic cylinders: a right lift cylinder 36 and left lift cylinder 38 (FIG. 2) that control vertical movement, and a center shift cylinder 40 that controls horizontal movement. The right and left lift cylinders 36, 38 are connected to a coupling 70 that includes lift arms 72 pivotally connected to the beam 28 for rotation about axis C. A bottom portion of the coupling 70 may have an adjustable length horizontal member 74 that is connected to the center shift cylinder 40.

Figure 2:
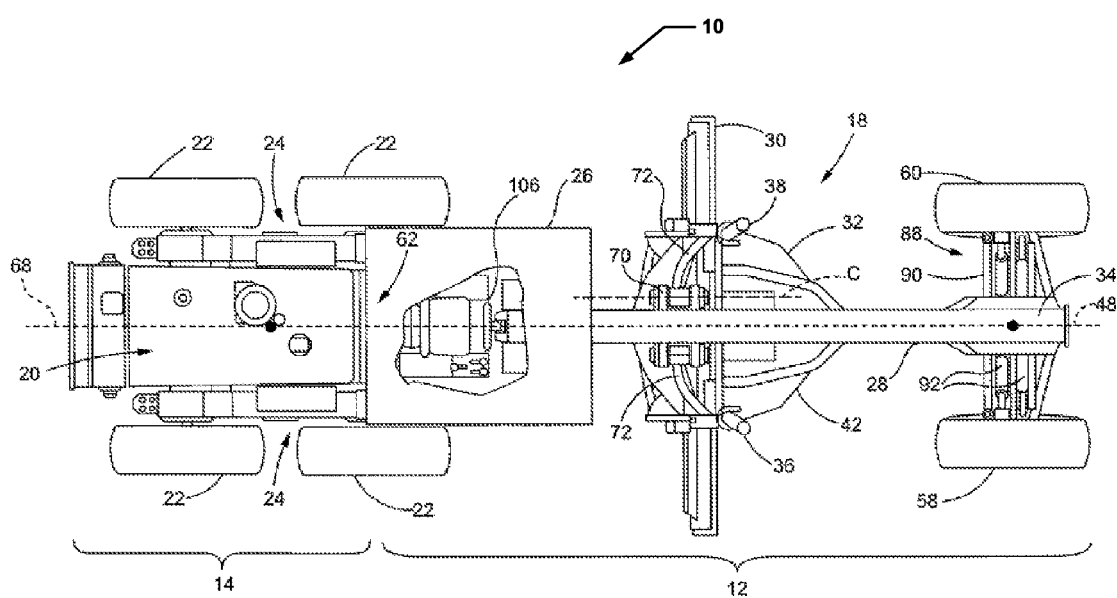
FIG. 2 is a top view of the motor grader of FIG. 1.

The drawbar 32 may include a large, flat plate, commonly referred to as a yoke plate 42. Beneath the yoke plate 42 is a circular gear arrangement and mount, commonly referred to as the circle 44. The circle 44 is rotated by, for example, a hydraulic motor referred to as the circle drive 46. Rotation of the circle 44 by the circle drive 46 rotates the attached blade 30 about an axis 'A' perpendicular to a plane of the drawbar yoke plate 42. The blade cutting angle is defined as the angle of the work implement 16 relative to a longitudinal axis 48 of the front frame 12. For example, at a zero degree blade cutting angle, the blade 30 is aligned at a right angle to the longitudinal axis 48 of the front frame 12 and beam 28 (FIG. 2).

The blade 30 is also mounted to the circle 44 via a pivot assembly 50 that allows for tilting of the blade 30 relative to the circle 44. A blade tip cylinder 52 is used to tilt the blade 30 forward or rearward. In other words, the blade tip cylinder 52 is used to tip or tilt a top edge 54 relative to the bottom cutting edge 56 of the blade 30, which is commonly referred to as a blade tip. The blade 30 is also mounted to a sliding joint associated with the circle 44 that allows the blade 30 to be slid or shifted from side-to-side relative to the circle 44. The side-to-side shift is commonly referred to as blade side shift. A side shift cylinder (not shown) or the like is used to control the blade side shift.

Motor grader steering is accomplished through a combination of both front wheel steering and machine articulation. As shown in FIG. 2, steerable traction devices, such as right and left wheels 58, 60, are associated with the first end 34 of the beam 28. Wheels 58, 60 may be both rotatable and tiltable for use during steering and leveling of a work surface 86 (FIG. 1). Front wheels 58, 60 are connected via a steering apparatus 88 that may include a linkage 90 and a hydraulic cylinder (not shown) for rotation at front wheel pivot points 80, FIG. 3, and tilt cylinders 92 for front wheel tilt. Front steerable wheels 58, 60 and/or rear driven traction devices 22, may include tracks, belts, or other traction devices as an alternative to wheels as is known in the art. The front wheels 58, 60 may also be driven, as is the case in motor graders provided with all wheel drive. For example, the power source may be operatively connected to a hydraulic pump (not shown) fluidly coupled to one or more hydraulic motors (not shown) associated with the front wheels 58, 60.

Figure 3:
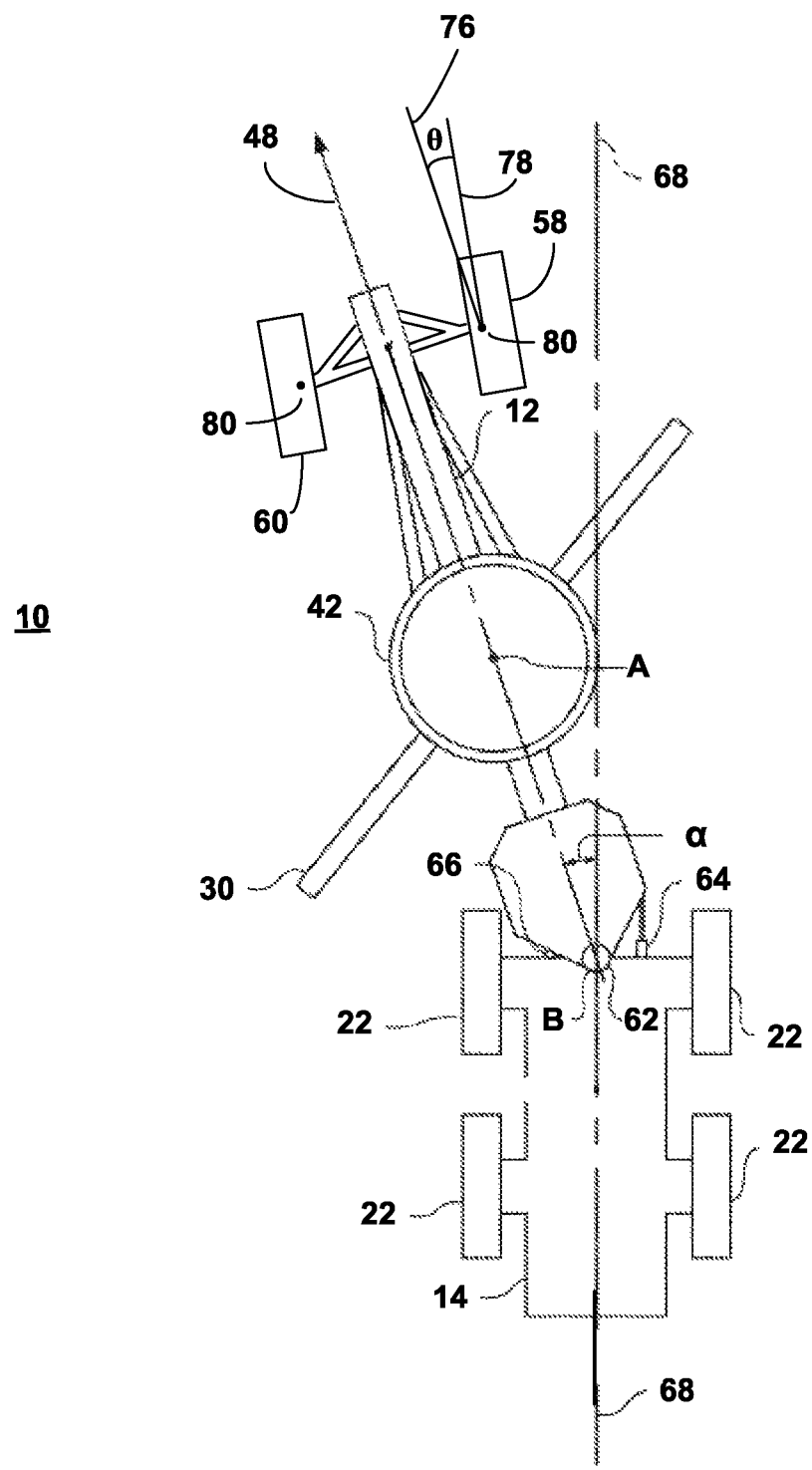
FIG. 3 is a schematic top view of a motor grader during an automatic articulation mode of operation in accordance with the present disclosure.

Referring to FIGS. 1 and 3, the articulated machine 10 includes an articulation joint 62 that pivotally connects front frame 12 and rear frame 14. Both a right articulation cylinder 64 and left articulation cylinder 66 (FIG. 3) are connected between the front frame 12 and rear frame 14 on opposing sides of the articulated machine 10. The right and left articulation cylinders 64, 66 are used to pivot the front frame 12 relative to the rear frame 14 about an articulation axis B (FIG. 1). In FIG. 2, the articulated machine 10 is positioned in the neutral or zero articulation angle position with the longitudinal axis 48 of the front frame 12 aligned with a longitudinal axis 68 of the rear frame 14.

FIG. 3 is a schematic top view of a articulated machine 10 with the front frame 12 rotated at an articulation angle α defined by the intersection of longitudinal axis 48 of front frame 12 and longitudinal axis 68 of the rear frame 14, the intersection corresponding with the position of articulation joint 62. In this illustration a positive α is indicative of a left articulation from the perspective of an operator facing forward, while a negative α (not shown) would be indicative of a right articulation. A front wheel steering angle θ is defined between a longitudinal axis 76 parallel to the longitudinal axis 48 of front frame 12, and a longitudinal axis 78 of the front wheels 58, 60, the angle θ having an origin at a pivot point 80 of the front wheels 58, 60. This is demonstrated in connection with right front wheel 58, but equally applies to left front wheel 60. As with articulation angle, a positive θ is defined as the front wheels 58,60 being to the left of longitudinal axis 76 and a negative θ defined as the front wheels 58, 60 being to the right of longitudinal axis 76.

In the interest of brevity and minimization of any risk of obscuring the principles and concepts in accordance to the present disclosure, unless other specified, the description of steering angles and articulation angles are assumed to be magnitudes with absolute values. That is, a range of 0 degrees to 20 degrees of articulation refers to 0 degrees to +20 degrees and 0 degrees to −20 degrees. Similarly, a range of steering angle of 0 degrees to 12 degrees refers to a range including both 0 degrees to +12 degrees and 0 degrees to −12 degrees. Another steering angle range of +12 degrees to 50 degrees includes steering angles of +12 degrees to +50 degrees and −12 degrees to −50 degrees. Lastly, steering angle ranges and articulation angle ranges are assumed to have non-overlapping values, so that when one range is, for example, a steering angle of 0 degrees to +12 degrees and another range is +12 degrees to +50 degrees, one value is either slightly higher or lower than exactly 12 degrees.

Figure 4:
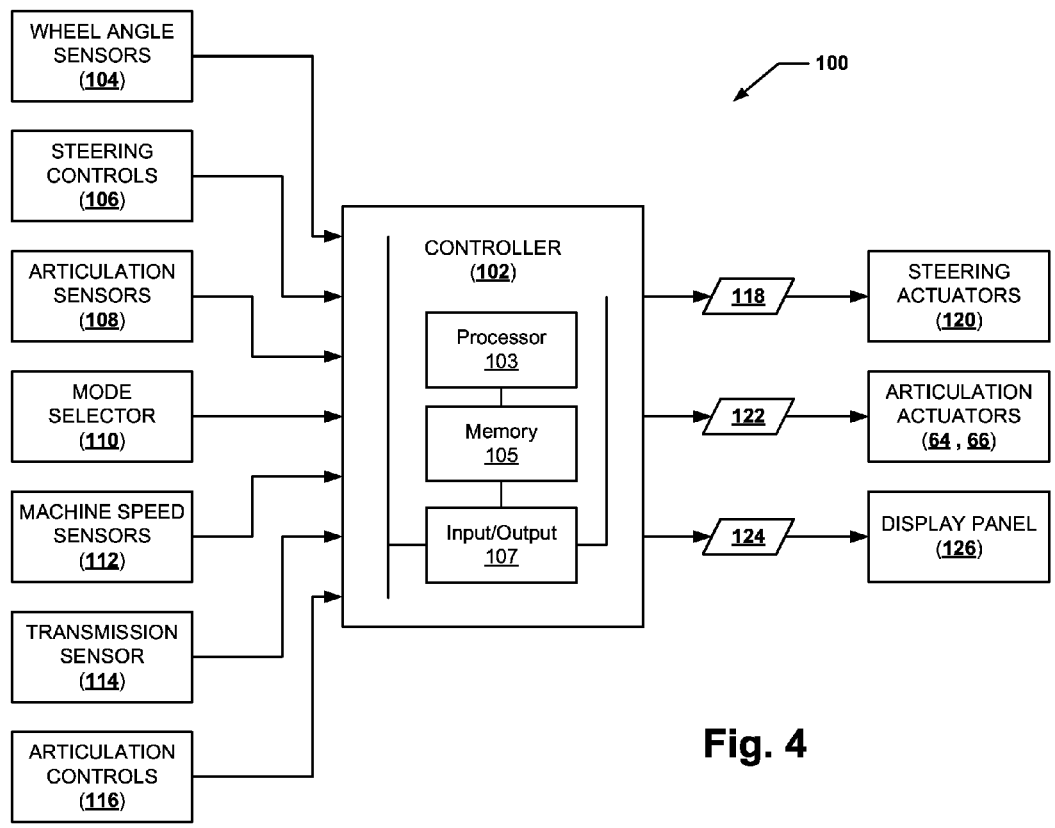
FIG. 4 is a block diagram of an exemplary steering control system in accordance with the present disclosure.

With reference now to FIG. 4, a block diagram of an exemplary steering control system 100 in accordance with an embodiment of the disclosure is provided. The control system 100 generally includes an electronic controller 102 configured, for example, via a control algorithm, to receive a plurality of instructions from various sensors and/or operator commands, and to responsively provide instructions to control various machine actuators and/or communicate with the machine operator. Controller 102 may include various components for executing software instructions designed to regulate various subsystems of the articulated machine 10. For example, the controller 102 may include a processor 103, a memory 105, that may include a random access memory (RAM) and a read-only memory (ROM). The memory 105 may also include a mass storage device, data memory, and/or on a removable storage medium such as a CD, DVD, and/or flash memory device, but does not include propagated media such as a carrier wave. The controller 102 may execute machine readable instructions stored in the memory 105. The controller 102 may also include input/output hardware 107 coupled to various sensors and output devices described below.

The control system 100 may be configured to control machine articulation for machine articulation based upon operator control of the front wheel steering. Accordingly, the controller 102 may be configured to receive an indication of the front wheel steering angle θ. In some examples, the articulated machine 10 includes one or more steering angle sensors 104 that may be associated with one or both of the right and left front wheels 58, 60. In some such examples, the steering angle sensor 104 is configured to monitor the wheel steering angle θ by monitoring angles of rotation of steering linkages and/or pivot points at the front wheels.

The steering angle sensors 104 may be configured to monitor the wheel steering angle by measuring the extension amount of an actuator (not shown), such as a hydraulic actuator, that controls the steering of front wheels 58, 60. Other sensor configurations are well known in the art. The steering angle sensors 104 may provide data "indicative of" the steering angle, which should be understood to mean direct measurements of the quantity or characteristic of interest, as well as indirect measurements, for example of a different quantity or characteristic having known relationships with the quantity or characteristic of interest.

The controller 102 may be configured to receive a signal from one or more operator steering controls 106 that may be employed to provide an indication of steering angle θ. These controls 106 may be, for example, a steering wheel 106 as shown in FIGS. 1-2, or any other type of operator input device, such as a dial, joystick, keyboard, pedal or other devices known in the art. In one embodiment, for example, a steering wheel sensor may be provided that senses the rotation or position of the steering wheel 106 to provide an indication of steering angle θ. Whether received via the steering angle sensors 104 or operator steering controls 106, a steering signal may be generated that is used in the controller to determine a steering angle of the front wheels 58, 60.

One or more articulation sensors 108 may be employed to provide an indication of the articulation angle α at the axis B between the rear frame 14 and front frame 12. In some examples, the articulation sensor 108 is a pivot sensor disposed at articulation joint 62 to sense rotation at articulation axis B. Additionally or alternatively, the articulation sensor 108 may be configured to monitor the extension of right and/or left articulation cylinders 64, 66. Steering angle sensors 104 and articulation sensors 108 could be any type of sensor known in the art, including, for example, potentiometers, extension sensors, proximity sensors, angle sensors and the like.

Other inputs that may be associated with the control system 100 may include instructions provided from a mode selector 110 disposed, for example, in operator station 26. The mode selector 110 may include a slider 214 for selecting an operating mode and a dial 216 for selecting a steering angle to articulation angle mode, discussed more below. The operating mode may be employed to select among various modes of operation including, for example, a manual mode, or one or more automatic modes. Other input mechanisms and selections may also be used.

Addition inputs may include machine speed sensors 112 and transmission sensors 114 located, for example, in rear compartment 20. Machine speed sensors 112 may be any sensor configured to monitor machine travel speed, for example, sensors associated with any of the front wheels, rear wheels, axle shafts, motors, or other components of the drive train. A transmission sensor 114 may be associated with the transmission to provide an indication of a current gear or output ratio. Alternatively, an indication of current gear or output ratio may be provided by data associated with operator controls for the transmission (not shown).

The control system 100 may also include outputs that affect operation of the articulated machine 10. Power steering instructions 118 may be provided to control steering actuators 120. Articulation actuators 64, 66 may be controlled by articulation control instructions 122 that may result, depending on operating mode, from either operator input via articulation controls 116 or developed automatically at controller 102. A state or mode of operation of the automated articulation function may be transmitted to an operator via communication instructions 124 and display panel 126.

Figure 5:
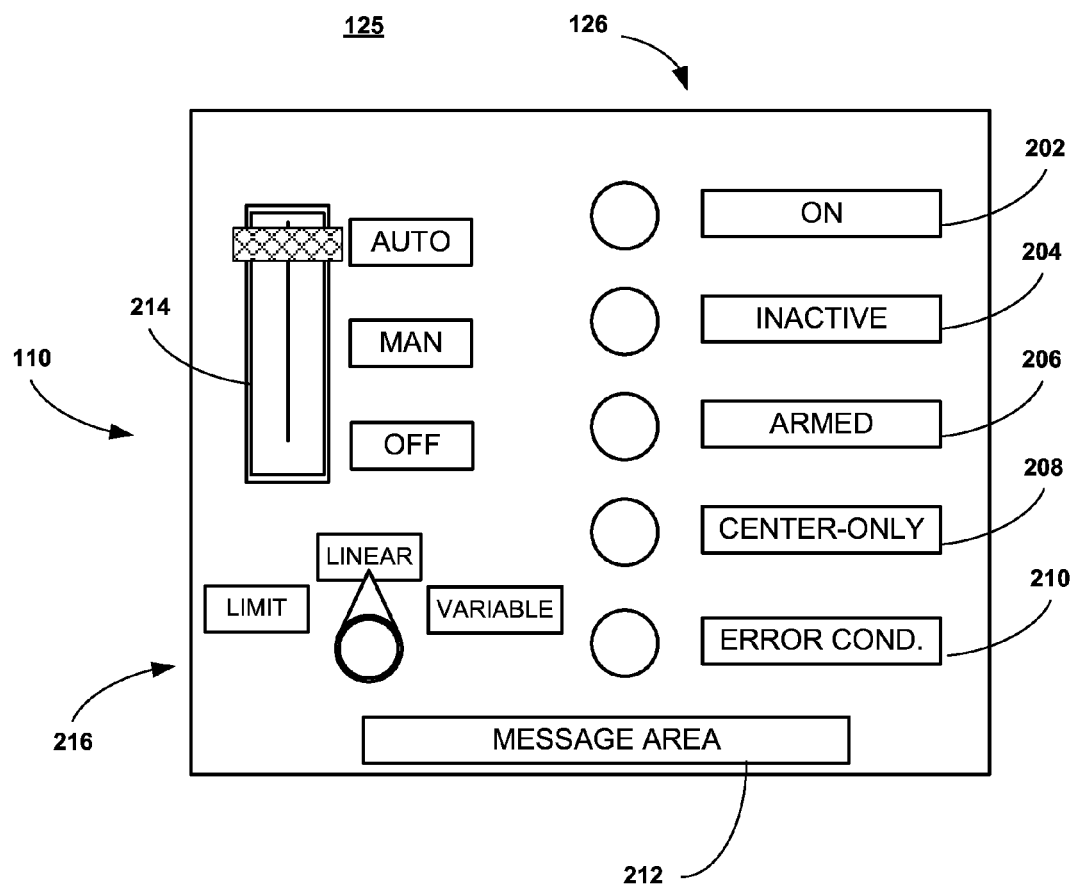
FIG. 5 is a simplified illustration of a cab control for an automatic articulation control function.

Referring to FIG. 5, a cab control 125 for the automatic articulation control function may include a mode selector 110, discussed above, and a display panel 126. The display panel 126 may include an "On" indicator 202 and an 'Inactive" indicator 204. The Inactive indicator 204 may generally indicate that one or more conditions is preventing activation of the automatic articulation control function. In the illustrated embodiment, more than one indicator may be used to represent some of the different operating states separately, such as "Armed" 206, "Center-Only" 208 and "Error Condition" 210. Under some conditions, more than one display may be active at a time, such as 'Error Condition' 210 and 'Inactive' 204. In some embodiments, a message area 212 may provide more detailed information to an operator or may provide instructions for the operator on steps to take should the automatic articulation control function be in one of the indicated states. In different embodiments, other indicators and combinations of display technology can used to receive mode selections and to convey information about the state of the automatic articulation control function, related messages, and help information. These display technologies may include touch screens, voice recognition, etc.

INDUSTRIAL APPLICABILITY

Figure 6:
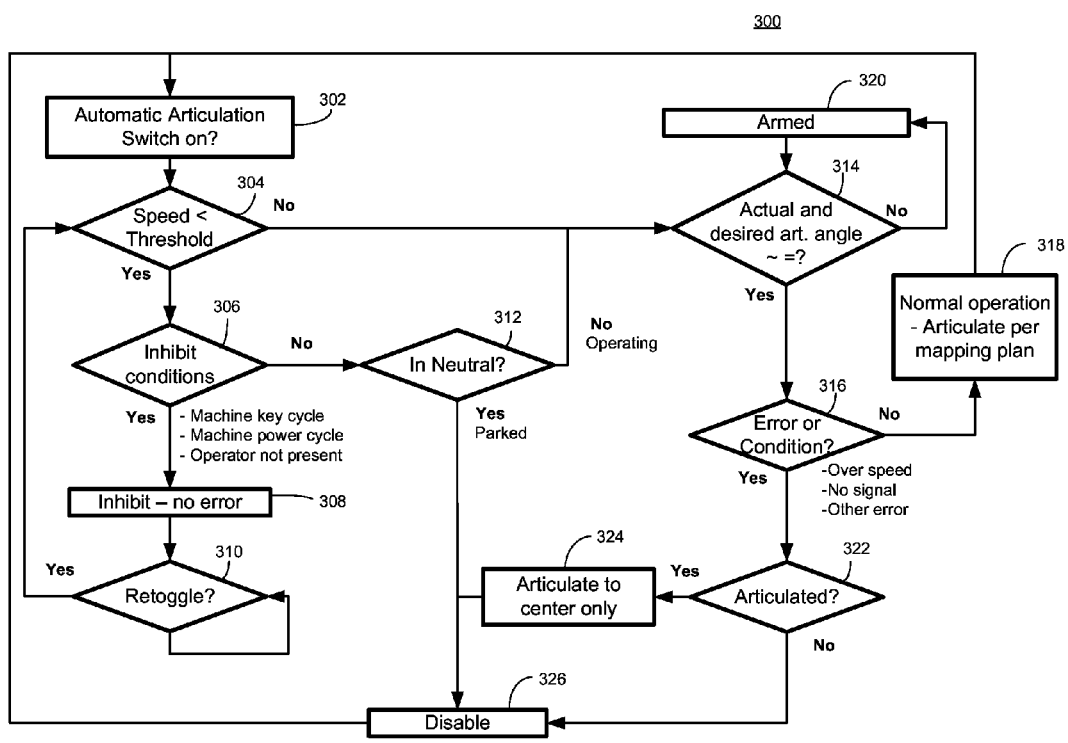
FIG. 6 is a flow chart depicting a process of implementing an automatic articulation control function.

FIG. 6 illustrates an exemplary control process 300 for managing automatic articulation behavior. The control process may be executed by a processor 103 of the controller 102 using computer-executable instructions stored in the memory 105.

At a block 302, the position of the mode selector 110 may be determined through known mechanisms. If the mode selector is in one of the automatic mode selection positions execution may continue to block 304. If the speed of the articulated machine 10 is below a threshold speed, for example, less than one or two miles per hour including stopped, the 'yes' branch may be followed to a block 306.

Generally, at block 306, when the mode selector 110 is set to an automatic operation setting, a determination is made if the articulated machine 10 is in a state where the operator may not be aware of the automatic articulation mode setting. Without a safety override, automatic articulation may occur without the operator expecting it. Changes in articulation angle alter the steering pattern of the vehicle, so if such changes occur when an operator does not expect it, the articulated machine 10 may turn differently than anticipated and could result in an accident.

So, at block 306, conditions are checked that indicate an operator may not be aware that the mode selector 110 is set to on. These conditions may include a machine key cycle or machine power cycle. That is, that when the engine was last started, the mode selector 110 was set to an on position. Another exemplary condition may be when a seat or cab sensor indicates that no operator is present when the mode selector 110 is set to an "ON" position. In these cases, an operator may not be aware of a pre-existing automatic articulation mode selection.

If any of these exemplary conditions, or other similar conditions are identified, the 'yes' branch from block 306 may be followed to block 308. At block 308, the automatic articulation control function may be disabled or inhibited. This does not represent, necessarily, an error condition, and may simply require that the operator toggle the mode selector 110 to "OFF" and back to "ON", as indicated at block 310. An appropriate indicator may be activated at the display panel 126. After toggling the mode selector 110, execution may return to block 304. In an embodiment, these conditions can disable the automatic articulation control function independently of groundspeed. That is, alternate control processes may evaluate these factors independently from groundspeed checking or in parallel with groundspeed checking.

If, at block 304, the groundspeed of the articulated machine 10 is below the threshold speed, the 'yes' branch may be taken, as before, to block 306. At block 306, if the conditions associated with inhibiting operation of the automatic articulation control function are clear, the 'no' branch from block 306 may be taken to block 312.

At block 312, a check may be made to determine if the transmission is in neutral, for example using transmission sensor 114. Because the transmission is in neutral and groundspeed is at or near zero, an assumption may be made that the vehicle is parked or stopped. However, even while stopped an operator or maintenance person may turn the front wheels 58, 60 to check for tire condition or to access a mechanical component for inspection or maintenance. Similar to the conditions above, should an operator turn the front wheels 58, 60 while the vehicle is not moving, and if there were no check for this condition, the articulated machine 10 may change its articulation angle causing the front frame 12, rear frame 14, or both to move. Such unexpected movement could injure personnel or damage nearby equipment or buildings. Therefore, if the transmission is in neutral, the 'yes' branch from block 312 may be taken to block 326 and the automatic articulation control function may be disabled or inhibited. Once disabled, the automatic articulation control function may be re-activated according to the steps beginning at block 302. An appropriate indicator may be activated at the display panel 126.

Returning to block 312, if the speed of the articulated machine 10 is below the threshold speed and none of the inhibit conditions are present, and if the transmission is not in neutral an assumption may be made that the articulated machine 10 is operating normally and execution may continue at block 314 or, in an embodiment block 318 (not specifically depicted). For example, the articulated machine 10 may be operating on a steep uphill grade or may be scraping a heavy or difficult work surface 86 that causes the machine 10 to come to a momentary halt or at least to slow below the threshold speed. In this situation, if the automatic articulation control function were automatically disabled it could create an inconvenience at the least and at the most cause a safety hazard should the operator be expecting automatic articulation when unbeknownst to him or her it had been disabled. The decision point at block 312 allows automatic articulation control to continue functioning in this situation for both safety and convenience reasons. Note that this condition is normally only be reached when the automatic articulation control function is already active and operating.

Returning to block 304, if the groundspeed of the articulated machine 10 is greater than the threshold speed the 'no' branch may be taken from block 304 and execution may continue at block 314. At block 314, an actual articulation angle and a desired articulation angle may be compared. A value of actual articulation angle may be determined directly or indirectly from data received via articulation sensors 108. Desired articulation angle may be calculated based on inputs from steering controls 106 and/or steering angle sensors 104, that is, by evaluating a current steering angle to determine the desired articulation angle. In some embodiments, the current steering angle to desired articulation angle may be a function of a nonlinear transfer function or some other mapping algorithm, as described in more detail below.

Any of several conditions may contribute to an actual articulation angle not being equal to a desired articulation angle. In one case, an operator may engage the automatic articulation control function, e.g. at block 302, when the current steering angle dictates a desired articulation angle that is simply not equal to the current articulation angle. For example, the articulated machine may be in alignment with zero articulation angle and the steering wheels oriented in a 35 degree left turn. In another example discussed more below, an error condition that has caused the automatic articulation control function to temporarily be disabled may clear but the actual and desired articulation angles may have diverged during the time when the automatic articulation control function was disabled. Activation of the automated articulation in these cases could cause a sudden and dramatic change in articulation angle and could cause changes to steering that may be difficult or impossible for an operator to control. In a worst-case scenario, if articulation were at −20 degrees and steering were at +45 degrees, activation of the automatic articulation control function would cause the rear frame 14 to rapidly move a full 40 degrees.

In some prior embodiments of automatic articulation control an operator might be required to manually observe the steering angle of the front wheels 58, 60 as well as the current articulation angle and attempt to activate the automatic articulation control function at an exact time when the two angles appear to be in alignment. This was found to be both difficult and a significant distraction to an operator.

At block 314, when the actual and desired articulation angles are not equal, or within a threshold angle range such as 0.2 degrees to −0.2 degrees the 'no' branch may be taken to block 320.

At block 320, the automatic articulation control function may be armed, that is, in a standby state so that the electronic controller 102 can monitor the actual and desired articulation angles and when they are within the threshold angle range engage the automatic articulation control function. This relieves the operator of the need to manually observe and time activation of the function but preserves the desirable characteristic of avoiding a rapid and significant change in articulation angle of the articulated machine 10 when engaging the automatic articulation control function.

When at block 314 the actual and desired articulation angles are at zero or are within the threshold angle range, the 'yes' branch may be taken to block 316. At block 316, the controller 102 may screen for any of several error conditions including but not limited to a groundspeed of the articulated machine 10 being over a limit, an invalid signal or input signal such as no groundspeed signal being available at the controller 102, or other errors such as steering sensor errors. In an embodiment, the maximum limit for groundspeed or threshold groundspeed may be about 20 mph, but may vary for different kinds of articulated machines 10 or even for different operation conditions. When no error conditions are found, execution may follow the 'no' branch to block 318.

At block 318, the automatic articulation control function may be activated and control articulation of the articulated machine 10 according to whatever control strategy is active. More details on different control strategies are discussed below with respect to FIGS. 7 through 10.

In an exemplary embodiment, the articulated machine 10 may be operated at an articulation angle α with a magnitude greater than zero between the front frame 12 and the rear frame 14 responsive to instructions from the electronic controller 102. For example, from a fully aligned position when the front wheels 58, 60 turn to the left (+θ) the electronic controller 102 may cause the articulated machine 10 to articulate to the left, designated as a positive articulation angle or +α. Similarly, from a fully aligned position when the front wheels 58, 60 turn to the right (−θ) the electronic controller 102 may cause the articulated machine 10 to articulate to the right designated as a negative articulation angle or α−α. Whether articulated to the left or to the right, a magnitude of the angle α is non-zero whenever the front frame 12 and rear frame 14 are not aligned.

Returning to block 316, when an error condition is present the 'yes' branch from block 316 may be taken to block 322. At block 322, a determination is made as to whether the articulated machine 10 is in an articulated state with a non-zero articulation angle, that is, with a magnitude outside a threshold angle range discussed above.

If at block 322, the articulated machine 10 is not articulated execution may take the 'no' branch to block 326 and the automatic articulation control function may be disabled. An appropriate indicator may be activated at the display panel 126.

If, at block 322, the articulated machine 10 has some non-zero angle of articulation, were the automatic articulation control function simply disabled, the articulated machine 10 may be fixed at some angle of articulation that is counterproductive to future steering angle settings. For example, if an articulated machine 10 is in a left-hand turn with a steering angle of +20 degrees and a corresponding articulation angle of +20 degrees at which time the ground speed increases above a groundspeed limit, simply disabling the automatic articulation control function would cause the articulation angle to remain at a +20 degree angle of articulation even though a steering angle may change to the right through zero or beyond. This would create an awkward situation where the machine is articulated to the left and the steering is articulated to the right, causing the articulated machine 10 to "crab" along the work surface.

To avoid this situation, execution may continue at block 324. At block 324, the automatic articulation control function may be configured to operate in a return-to-zero mode so that it responds only to steering commands that would cause the articulation angle to return to zero. That is, any detected steering angle that would increase the desired articulation angle is ignored and any detected steering angle that causes the desired articulation angle to decrease is processed. When the articulation angle decreases to zero, or is within the minimum threshold angle range, execution continues at block 326 and the automatic articulation control function is disabled.

When, at block 316, the error condition has cleared and the actual and desired articulation angles are approximately equal at block 314 the automatic articulation control function may be reactivated and normal operation continued at block 318.

The exemplary control process 300 of FIG. 6 is but one representation of steps that may be followed to implement the controls and features disclosed. A person of ordinary skill in the art would recognize that other implementations could be developed that implement the safety and control functions discussed above. For example, various inhibit and error conditions could drive interrupts so that automatic articulation control could be performed via a state change paradigm.

FIGS. 7-10 illustrate exemplary transfer functions related to full range and non-linear steering angle to articulation angle control. These figures illustrate an exemplary embodiment where steering angle can range from about −50 degrees to +50 degrees and articulation angle can range from about −20 degrees to +20 degrees. Other articulation machines may have different steering and articulation angle ranges. The principles disclosed here apply to those different ranges as well.

The articulation angle transfer functions described below allow an operator a rich selection of operating modes for automatic articulation control. In various embodiments, the dial 216 portion of the mode selector 110 may be modified to allow individual selection of these examples or other similar transfer functions for use in various operating environments.

FIG. 7 illustrates a non-linear transfer function 400 of steering angle on the x-axis to articulation angle on the y-axis. The transfer function 400 shows a first range 402 with a first slope of about 1 or steering angle to articulation angle ratio of approximately 1:1 from about −10 degrees to about +10 degrees. The transfer function 400 shows a second range 406 below about −10 degrees and above 404 about +10 degrees that has a second slope of about ¼ or about 1 degree of articulation angle to 4 degrees of steering angle.

In an embodiment, rather than using a fixed steering angle degree to transition from a first range 402 to a second range 404, 406, the controller 102 may use a threshold percentage of steering angle, such as a range of about 45% to 55% of maximum steering angle. The first and second ranges 402, 404-406 constituting sub-ranges of the full steering angle range. Each sub-range has steering angle values that are unique, that is not in common with other sub-ranges.

In contrast to the prior art transfer functions 500 of FIG. 11 or 510 of FIG. 12, that have a 1:1 correspondence of steering angle to articulation angle and then cap either articulation or steering, the transfer function 400 provides at least some change in articulation over the full range of steering angles. The approximately 1:1 ratio in the first range of FIG. 4 may allow the rear wheels to track the front wheels of the articulated machine 10, for example when grading or scraping around a curve, such as a cul-de-sac. The second range 404, 406 above and below about 10 degrees of steering angle allows continuous increases in articulation angle over the full remaining steering angle, allowing the operator to significantly improve turning radius, when desired.

FIG. 8 illustrates an alternate embodiment of FIG. 7, showing a transfer function 408 with a first range 410 having a first ratio and a second range 412, 414 having a second, lower ratio of steering angle to articulation angle. The embodiment of FIG. 8 shows 'porch' regions 416, 418 that illustrate an embodiment where the final few degrees of steering angle do not change the articulation angle. The principal of FIG. 7 is maintained in that the separate transfer function slopes of the first and second ranges allow a front-to-back wheel tracking region (range 410) and a less than 1:1 region (range 412, 414).

Figure 9:
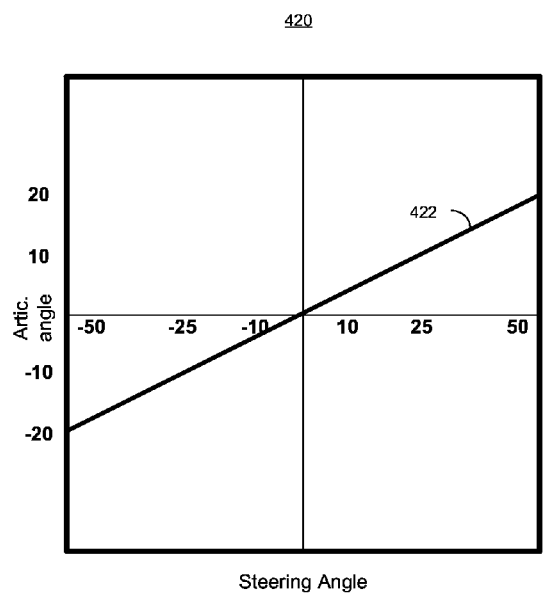

FIG. 9 illustrates an alternate embodiment from FIGS. 7 and 8 and illustrates a transfer function 420 with one region 422 having a constant slope with a rate of more than one degree of steering angle to one degree of articulation angle. The transfer function 420 offers consistent steering to articulation changes over the full range of steering angles and offers an operator a predicable rate of change of articulation, but does not necessarily provide front wheel to back wheel tracking.

Figure 10:
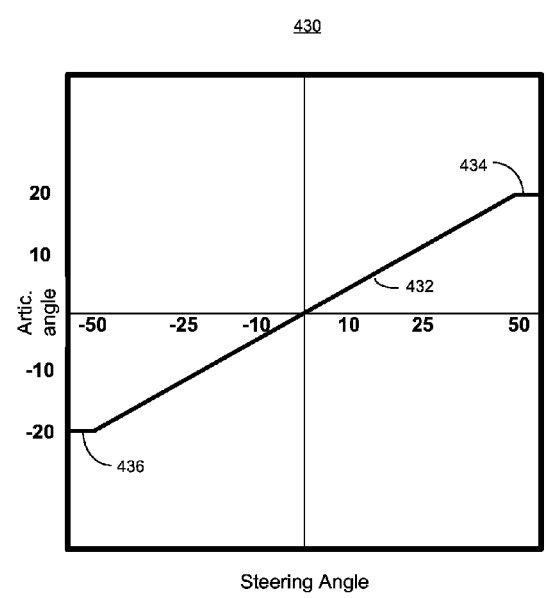

FIG. 10 is an alternate embodiment of the transfer function 420 of FIG. 9 and illustrates a transfer function 430 with a constant ratio region 432 that is less than 1:1 steering angle to articulation angle but with porches 434 and 436 so that articulation does not necessarily track to the full extent of the steering range.

The exemplary embodiments illustrated in FIGS. 7-10 may be modified with additional regions having various linear or non-linear slopes. The above illustrations are not limiting with respect to additional variations of transfer curve implementations.

The exemplary embodiments illustrated in FIGS. 7-10 may also have applicability to special cases when operating in reverse. For example, an operator-initiated signal may indicate a desired steering path, or steering path change. When traveling in the forward direction this may most naturally take place by sending a signal that controls front wheel steering angle. However, in some cases, it may be advantageous to first adjust articulation angle and have the steerable wheels track the adjustment to articulation angle. This may be particularly true when operating in reverse.

Another mode of automatic articulation control may be supported that allows such directional control to be accomplished when operating in reverse through adjustments to the articulation angle operator control, generally via a joystick (not depicted), which then drives changes to the steering angle. The changes to the steering angle based on articulation angle may use the same variations of transfer functions discussed above that incorporate a more than 1:1 ratio of steering angle to articulation angle to map at least a portion of the articulation angle range to steering angle range.

FIGS. 11-12 depict prior art transfer functions related to partial range steering control angle. As discussed above, FIG. 11 shows a prior art transfer function 500 with a constant 1:1 region 502 and zero slope regions 504 and 506. That is, for any steering angle greater than +20 degrees or less than −20 degrees, the articulation angle is fixed at a corresponding +20 degrees or minus 20 degrees.

FIG. 12 illustrates a transfer function 510 with a constant 1:1 region 512 and constrained steering regions 514 and 516 where the steering is limited to +20 degrees and −20 degrees respectively when the maximum articulation angles of +20 and −20 degrees are reached.

The present disclosure relates generally to a method of improving steering control for an articulated machine having front wheel steering. In general, the disclosed systems receive steering commands from the operator, and, based upon the steering command or signals indicative of front wheel steering angle, automatically command articulation according to a predetermined formula. Automatic control of articulation angle can reduce operator distractions during operation, improve turning radius, cause the rear wheels to track in the path of the front wheels, etc.

The automatic articulation mode is instantiated and executed via the computerized execution of instructions stored on a physically-embodied computer-readable medium or memory, e.g., a disc drive, flash drive, optical memory, ROM, etc. The controller 102 may be physically embodied in one or more controllers and may be separate from or part of one or more existing controllers such as one or more engine controllers and/or transmission controllers.

It will be appreciated that the present disclosure provides a system and method for facilitating an automatic articulation mode with selectable modes and enhanced safety and performance features. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of managing articulation in an articulated machine, the method comprising:
    identifying, at an electronic controller, operating conditions that are incompatible with automatic articulation control, wherein the operating condition is a difference between an actual articulation angle and a desired articulation angle being outside a preset range;
    receiving a signal requesting activation of an automatic articulation control function;
    pending activation of the automatic articulation control function when an operating condition exists that is incompatible with operation of the automatic articulation control function;
    determining that the operating condition has cleared including evaluating whether the difference between the actual and the desired articulation angle are within the preset range;
    when the operating condition is clear, activating the automatic articulation control function; and
    changing an articulation angle of the articulated machine responsive to changes in a steering angle of the articulated machine after activating the automatic articulation control function.

2. The method of claim 1, further comprising:
    after determining that the operating condition has cleared and before activating the automatic articulation control function, determining that no other conditions exist that preclude activation of the automatic articulation control function.

3. The method of claim 1, wherein receiving the signal requesting activation of the automatic articulation control function is a signal from a mode selector.

4. The method of claim 3, further comprising:
after receiving the signal, providing a notification at an operator station that the automatic articulation control function is pending activation.

5. The method of claim 2, wherein the notification is illumination of an indicator at an operator station.

6. A controller that manages articulation in an articulated machine, the controller comprising:
a processor;
at least one sensor input that receives information used to determine an actual articulation angle;
at least one sensor input that receives information used to determine a steering angle for use in determining a desired articulation angle; and
a memory storing computer-executable instructions that when executed by the processor cause the controller to:
receive a signal requesting activation of an automatic articulation control function;
evaluate whether the actual articulation angle and the desired articulation angle are within a preset range;
activate the automatic articulation control function only when the actual articulation angle and the desired articulation angle are within the preset range; and
provide a signal that causes a change in the actual articulation angle of the articulated machine responsive to changes in the steering angle after activating the automatic articulation control function.

7. The controller of claim 6, wherein the memory stores further instructions that when executed by the processor cause the controller to determine that no other conditions adverse to operation of the automatic articulation control function are present prior to activating the automatic articulation control function.

8. The controller of claim 6, wherein conditions adverse to operation of the automatic articulation control function includes a ground speed of the articulated machine being over a predetermined speed.

9. The controller of claim 6, wherein conditions adverse to operation of the automatic articulation control function includes no input signal from a ground speed sensor coupled to the controller.

10. The controller of claim 6, wherein conditions adverse to operation of the automatic articulation control function includes an invalid signal at the at least one sensor input that receives information used to determine the actual articulation angle.

11. The controller of claim 6, wherein conditions adverse to operation of the automatic articulation control function includes an invalid signal at the at least one sensor input that receives information used to determine the steering angle.

12. The controller of claim 6, wherein the preset range is from about plus one degree to about negative one degree of difference between the actual articulation angle and the desired articulation angle.

13. A method of managing an automatic articulation control function using an electronic controller in an articulated machine having front wheels that are steerable, the front wheels attached to a front frame, the front frame and a rear frame pivotally connected at an articulation joint, the method comprising:
determining that the automatic articulation control function is pending activation;
determining that a condition exists that contravenes the automatic articulation control function from being activated comprising:
calculating, at the electronic controller, a desired articulation angle based on operating conditions at the articulated machine,
determining, at the electronic controller, an actual articulation angle, and
determining, at the electronic controller, that a difference between the actual articulation angle and the desired articulation angle is outside an alignment value range;
continue pending activation of the automatic articulation control function until determining that all conditions that contravene activation of the automatic articulation control function have been cleared;
activating, at the electronic controller, the automatic articulation control function; and
operating the articulated machine using the automatic articulation control function.

14. The method of claim 13, wherein determining that all conditions that contravene activation of the automatic articulation control function have cleared comprises:
monitoring, at the electronic controller, the actual articulation angle and re-calculating the desired articulation angle during operation of the articulated machine;
determining that the difference between the actual articulation angle and the desired articulation angle is within the alignment value range.

15. The method of claim 13, further comprising providing an indication in an operator station of the articulated machine that the automatic articulation control function is pending activation.

16. The method of claim 15, wherein providing the indication further comprises providing the indication that no other condition adverse to activation of the automatic articulation control function is present other than articulation angle alignment.

* * * * *